United States Patent
Taniguchi et al.

(10) Patent No.: US 11,955,614 B2
(45) Date of Patent: Apr. 9, 2024

(54) BATTERY PACK INCLUDING A HEATER SUBSTRATE

(71) Applicant: TOYOTA JIDOSHA KABUSHIKI KAISHA, Toyota (JP)

(72) Inventors: Naotaka Taniguchi, Nagoya (JP); Akihiro Ozeki, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 28 days.

(21) Appl. No.: 17/450,177

(22) Filed: Oct. 7, 2021

(65) Prior Publication Data
US 2022/0173449 A1  Jun. 2, 2022

(30) Foreign Application Priority Data
Nov. 30, 2020 (JP) .................. 2020-198456

(51) Int. Cl.
| | | |
|---|---|---|
| H01M 10/615 | (2014.01) | |
| H01M 10/42 | (2006.01) | |
| H01M 10/617 | (2014.01) | |
| H01M 10/625 | (2014.01) | |
| H01M 50/183 | (2021.01) | |
| H01M 50/209 | (2021.01) | |

(52) U.S. Cl.
CPC ....... *H01M 10/615* (2015.04); *H01M 10/425* (2013.01); *H01M 10/617* (2015.04); *H01M 10/625* (2015.04); *H01M 50/183* (2021.01); *H01M 50/209* (2021.01); *H01M 2220/20* (2013.01)

(58) Field of Classification Search
CPC ............ H01M 10/615; H01M 10/617; H01M 10/625; H01M 10/425; H01M 5/209; H01M 5/183
See application file for complete search history.

(56) References Cited

U.S. PATENT DOCUMENTS
| | | |
|---|---|---|
| 2016/0049702 A1 | 2/2016 | Oishi et al. |
| 2020/0243926 A1 | 7/2020 | Dawley et al. |

FOREIGN PATENT DOCUMENTS
| | | | | |
|---|---|---|---|---|
| CN | 105322114 A | 2/2016 | | |
| CN | 107408647 A | 11/2017 | | |
| DE | 102008059954 A1 | * 6/2010 | ............... | F28F 1/00 |
| EP | 1030387 A1 | * 8/2000 | ........ | H01M 10/4207 |
| EP | 2315297 A1 | * 4/2011 | ........ | H01M 10/4207 |
| JP | 2014-146489 A | 8/2014 | | |
| JP | 2014-194904 A | 10/2014 | | |
| WO | 2012/153230 A1 | 11/2012 | | |
| WO | WO-2013147292 A1 | * 10/2013 | ............. | G01K 13/00 |
| WO | WO-2017052050 A1 | * 3/2017 | ........ | H01M 10/4207 |
| WO | WO-2017061708 A1 | * 4/2017 | ............. | H01M 10/04 |

* cited by examiner

*Primary Examiner* — Jimmy Vo
(74) *Attorney, Agent, or Firm* — Oblon, McClelland, Maier & Neustadt, L.L.P.

(57) ABSTRACT

A battery pack includes a battery stack including plural battery cells, a housing accommodating the battery stack, a heater substrate including plural metal patterns, and plural heat conduction sheets. The battery cells are arrayed in a thickness direction. The heater substrate is disposed inside the housing such that the metal patterns oppose the corresponding battery cells. The metal patterns generate heat when electrified. The heat conduction sheets are interposed between the corresponding battery cells and metal patterns.

14 Claims, 8 Drawing Sheets

BATTERY PACK INCLUDING A HEATER SUBSTRATE

CROSS-REFERENCE TO RELATED APPLICATION

This application claims priority under 35 USC 119 from Japanese Patent Application No. 2020-198456 filed on Nov. 30, 2020, the disclosure of which is incorporated by reference herein in its entirety.

BACKGROUND

Technical Field

The present disclosure relates to a battery pack.

Related Art

A battery pack has been known since heretofore (for example, see Japanese Patent Application Laid-Open (JP-A) No. 2014-194904) in which an accommodating container accommodates a battery module formed of plural battery cells, and a sheet heater is attached to an inner face of a lid portion of the accommodating container.

The battery module formed of plural battery cells declines in performance at times of low temperature. Accordingly, in this battery pack the accommodating container is heated by the sheet heater. As a result, the battery module is heated indirectly via the accommodating container.

SUMMARY

However, with the structure described above, because heating is applied to the battery module, temperature differences may occur depending on positions of the battery cells. That is, in the structure described above, not every battery cell may be heated and consequently the battery cells may not be warmed simultaneously (uneven warming may occur).

Accordingly, an object of the present disclosure is to provide a battery pack that may heat each one of plural battery cells accommodated in a housing.

Solution to Problem

In order to achieve the object described above, a battery pack according to a first aspect includes: a battery stack including plural battery cells arrayed in a thickness direction; a housing accommodating the battery stack; a heater substrate including plural metal patterns that generate heat when electrified, the heater substrate being disposed inside the housing such that the metal patterns respectively oppose the plurality of battery cells; and plural heat conduction sheets respectively interposed between the plural battery cells and the plural metal patterns.

According to the battery pack according to the first aspect, the plural battery cells are accommodated side-by-side in the thickness direction thereof inside the housing; the heater substrate including the plural metal patterns that generate heat when electrified is also disposed inside the housing. The metal patterns of the heater substrate oppose the battery cells, and the heat conduction sheets are respectively interposed between the battery cells and the metal patterns. Therefore, when the metal patterns generate heat, the battery cells are heated via the heat conduction sheets. That is, each one of the plural battery cells accommodated in the housing is heated.

In a battery pack according to a second aspect, in the battery pack according to the first aspect, resist marks are provided at the heater substrate, the resist marks specifying areas in which the heat conduction sheets are provided.

According to the battery pack according to the second aspect, the resist marks are provided at the heater substrate, and the resist marks specify the areas in which the heat conduction sheets are to be provided. Therefore, the heat conduction sheets may be provided easily without being mispositioned, and the battery cells may be efficiently heated effectively.

In a battery pack according to a third aspect, in the battery pack according to the second aspect, a length of the metal patterns is greater than a length of the resist marks.

According to the battery pack according to the third aspect, lengths of the metal patterns are longer than lengths of the resist marks. Resistance values (and heat generation amounts) of the metal patterns are regulated by lengths thereof (lengths of metal wires), widths thereof (numbers of metal wires), and thicknesses of the metal wires. Therefore, if the widths of the metal patterns are constant and heat generation amounts of at least a predetermined value are required, reducing thicknesses of the metal wires can be avoided. Thus, even if placement areas in which the metal patterns are formed are made smaller in the width direction, the resistance values (and heat generation amounts) may be adjusted without breaks in the metal patterns.

In a battery pack according to a fourth aspect, in the battery pack according to any one of the first to third aspects, the metal patterns are copper patterns.

According to the battery pack according to the fourth aspect, the metal patterns are formed as copper patterns. Copper features a resistivity-temperature characteristic in which the resistivity is smaller at times of low temperature and the resistivity is greater at times of high temperature. Accordingly, heat generation amounts are greater at times of low temperature. Therefore, each battery cell may be warmed in a short duration. Further, because heat generation amounts are smaller at times of high temperature, ignition in the battery cells is prevented.

In a battery pack according to a fifth aspect, in the battery pack according to any one of the first to fourth aspects, the housing is fabricated of resin and accommodates the battery stack in a hermetically sealed state.

According to the battery pack according to the fifth aspect, the housing is fabricated of resin and accommodates the battery stack in the hermetically sealed state. The housing that is fabricated of resin has low thermal conductivity and is resistant to conducting heat inside the housing to the outside. Therefore, even with a heater substrate whose metal patterns oppose only one wall face of each battery cell, the battery cells accommodated in the hermetically sealed housing are warmed efficiently.

In a battery pack according to a sixth aspect, in the battery pack according to any one of the first to fifth aspects, the battery stack is an auxiliary power source.

According to the battery pack according to the sixth aspect, the battery stack is an auxiliary power source. Therefore, when the battery pack is mounted in, for example, a self-driving vehicle, even if a main power source ceases to function due to a malfunction or the like, running for some distance is possible. Thus, the self-driving vehicle may be moved to a safe location.

In a battery pack according to a seventh aspect, the battery pack according to any one of the first to sixth aspects further includes a reinforcing member disposed inside the housing, the reinforcing member being formed in a frame shape capable of accommodating the battery stack at an inner side thereof, wherein a connecting portion extending in the thickness direction is disposed at an upper end portion of the reinforcing member.

According to the battery pack according to the seventh aspect, the connecting portion that extends in the thickness direction of the battery cells is disposed at the upper end portion of the reinforcing member disposed inside the housing. Therefore, even when a load is applied in the thickness direction of the battery cells, the connecting portion acts as a bracing rod and withstand load performance is assured.

In a battery pack according to an eighth aspect, the battery pack according to any one of the first to seventh aspects further includes: a side lid portion that closes off an opening portion formed in one side portion of the housing; and an upper lid portion that closes off an opening portion formed in an upper portion of the housing, wherein the side lid portion includes an engaged portion with which an engaging portion formed at the upper lid portion engages.

According to the battery pack according to the eighth aspect, the side lid portion includes the engaged portion with which the engaging portion formed at the upper lid portion is engaged. Therefore, compared with a structure in which a housing includes an engaged portion with which an engaging portion formed at an upper lid portion is engaged, a height of the housing is reduced, and the size of the battery pack is reduced by a corresponding amount.

In a battery pack according to a ninth aspect, the battery pack according to any one of the first to eighth aspects further includes: a side lid portion that closes off an opening portion formed in one side portion of the housing; and a busbar that electrically connects an electrode terminal provided at the battery stack with an electrode terminal provided at the side lid portion, wherein the side lid portion includes a tilting prevention portion that prevents tilting of the busbar at a time of attachment of the busbar.

According to the battery pack according to the ninth aspect, the side lid portion includes the tilting prevention portion that prevents tilting of the busbar at the time of attachment of the busbar. Therefore, ease of operation of attaching the busbar is improved compared with a structure in which a side lid portion does not include a tilting prevention portion.

In a battery pack according to a tenth aspect, in the battery pack according to the ninth aspect, the tilting prevention portion includes a slit portion into which a pawl portion formed at the busbar is inserted.

According to the battery pack according to the tenth aspect, the tilting prevention portion is structured by the slit portion into which the pawl portion formed at the busbar is inserted. Therefore, the structure of the tilting prevention portion is simplified compared with a structure in which a tilting prevention portion is separately provided.

Effects

As described above, according to the present disclosure, each one of plural battery cells accommodated in a housing may be heated.

BRIEF DESCRIPTION OF THE DRAWINGS

Preferred embodiments will be described in detail based on the following figures, wherein.

DETAILED DESCRIPTION

Figure 1:
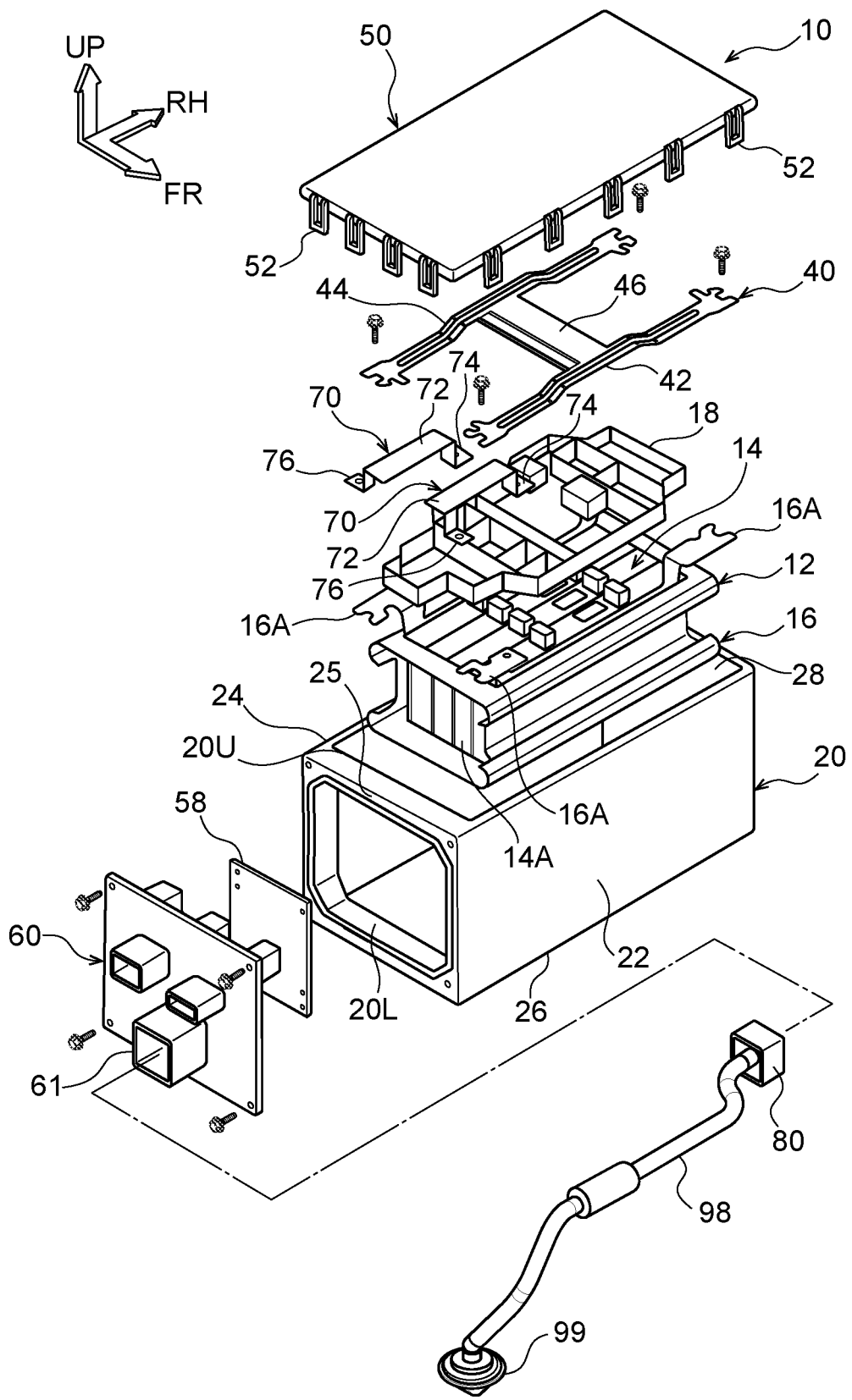
FIG. 1 is an exploded perspective view showing a battery pack according to a present exemplary embodiment.

Below, an exemplary embodiment of the present disclosure is described in detail in accordance with the drawings. A battery pack 10 (see FIG. 1) according to the present exemplary embodiment is an auxiliary power source to be mounted at a self-driving vehicle (not shown in the drawings) that runs under electric power. That is, the battery pack 10 is a backup power source for enabling the self-driving vehicle to run some distance if a battery stack that is a main power source (not shown in the drawings) ceases to function due to a malfunction or the like.

For convenience of description, the arrow UP that is shown where appropriate in the drawings represents an upper direction of the battery pack 10, an arrow FR represents a front direction of the battery pack 10, and an arrow RH represents a right direction of the battery pack 10. Therefore, where the directions upper and lower, front and rear, and left and right are recited without being particularly specified in the descriptions below, these represent upper and lower in a vertical direction of the battery pack 10, front and rear in a front-and-rear direction of the battery pack 10, and left and right in a left-and-right direction of the battery pack 10.

Figure 2:
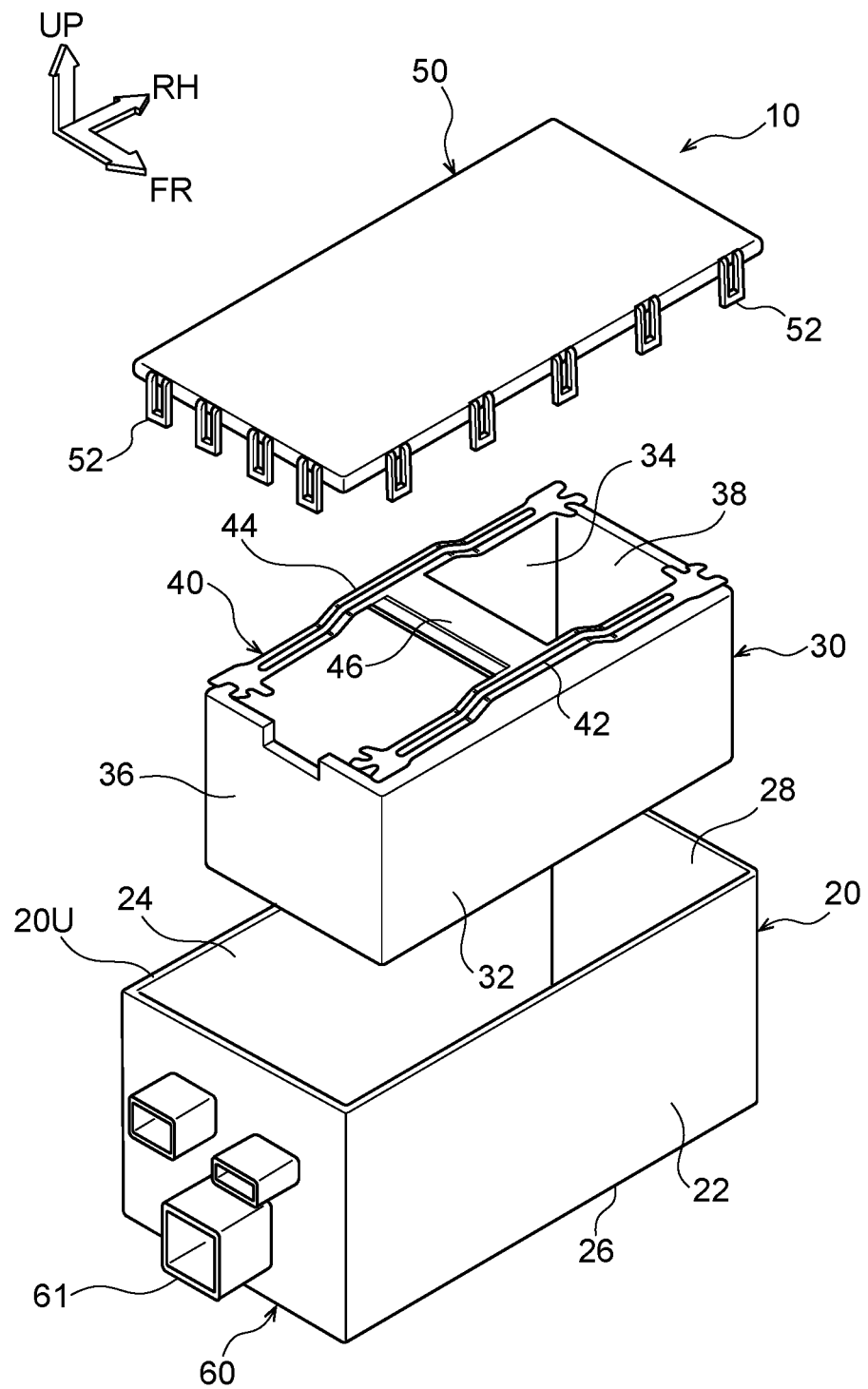
FIG. 2 is an exploded perspective view showing a reinforcing member provided in a case of the battery pack according to the present exemplary embodiment.

As shown in FIG. 1 and FIG. 2, the battery pack 10 according to the present exemplary embodiment includes a case 20, a reinforcing member 30 (not shown in FIG. 1), a battery stack 12 (not shown in FIG. 2), a busbar module 18 and a flue plate 40. The case 20 is fabricated of resin and serves as a housing. The reinforcing member 30 is fabricated of metal and is arranged along an inner face of the case 20. The battery stack 12 is accommodated at an inner side of the reinforcing member 30 (inside the case 20). The busbar module 18 is provided above the battery stack 12. The flue plate 40 is disposed above the busbar module 18 and serves as a metal plate.

The battery pack 10 according to the present exemplary embodiment further includes a cover member 50, a connector module 60, a monitoring circuit board 58 and a check valve 80. The cover member 50 is fabricated of resin and serves as an upper lid portion that is capable of closing off an opening portion 20U formed in an upper portion of the case 20. The connector module 60 is fabricated of resin and serves as a side lid portion that is capable of closing off an opening portion 20L formed in one side portion (a left side portion) of the case 20. The monitoring circuit board 58 is disposed at the inner side of the connector module 60. The check valve 80 is attached to the outer side of the connector module 60.

The case 20 is formed of a resin material such as, for example, polybutylene terephthalate (PBT) or the like. The case 20 includes a floor wall 26 in a rectangular flat plate shape, a front wall 22 and rear wall 24 in rectangular flat plate shapes, and a right side wall 28 in a rectangular flat plate shape. The longer direction of the floor wall 26 is in the left-and-right direction. The longer directions of the front wall 22 and rear wall 24 are in the left-and-right direction. The longer direction of the right side wall 28 is in the front-and-rear direction. The right side wall 28 corresponds to another side portion (a right side portion).

The left side portion of the case 20 is formed as the opening portion 20L. Upper-left end portions of the front wall 22 and the rear wall 24 are integrally connected by a long, narrow connecting member 25. Thus, the left side portion of the case 20 is formed in a rectangular frame shape. The connector module 60 is attached by screw-fixing or the like to the left side portion formed in this rectangular frame shape. The connector module 60 is formed substantially in a rectangular flat plate shape of a resin material such as, for example, polyphenylene sulfide (PPS) or the like. Thus, the left side portion is closed off.

As shown in FIG. 2, the reinforcing member 30 includes a front wall 32, a rear wall 34, a right side wall 38 and a left side wall 36. The front wall 32 is arranged along an inner face of the front wall 22, the rear wall 34 is arranged along an inner face of the rear wall 24, the right side wall 38 is arranged along an inner face of the right side wall 28, and the left side wall 36 opposes an inner face of the connector module 60. That is, the reinforcing member 30 is formed in a rectangular frame shape (a quadrangular tube shape) that is open in the vertical direction.

The front wall 32 and rear wall 34 of the reinforcing member 30 are formed of, for example, steel plate with a thickness of 1.4 mm, and the left side wall 36 and right side wall 38 are formed of, for example, aluminium plate with a thickness of 5.5 mm. Respective left and right end portions of the reinforcing member 30 and the rear wall 34 are attached to respective front end faces and rear end faces of the left side wall 36 and right side wall 38 by screw-fixing or the like.

The flue plate 40 is disposed at an upper end portion of the front wall 32 and an upper end portion of the rear wall 34 of the reinforcing member 30. The flue plate 40 is formed in a substantial "H" shape in plan view of, for example, steel plate with a thickness of around 2.0 mm. A front arm 42 and a rear arm 44 of the flue plate 40 extend in the left-and-right direction. Respective left and right end portions of the front arm 42 and the rear arm 44 are attached by screw-fixing or the like both to arms 16A protruding from a holder 16, which is described below, and to the upper end portion of the left side wall 36 and upper end portion of the right side wall 38 of the reinforcing member 30.

A connecting portion 46 connects left-and-right direction central portions of the front arm 42 and rear arm 44 of the flue plate 40 (extending in a thickness direction of battery cells 14, which are described below). The connecting portion 46 is disposed between a left-and-right direction central portion of the upper end portion of the front wall 32 and a left-and-right direction central portion of the upper end portion of the rear wall 34. The front arm 42 and the rear arm 44 are formed with a width of the front arm 42 and a width of the rear arm 44 being the same. The connecting portion 46 is formed with a width greater than the widths of the front arm 42 and the rear arm 44.

Figure 3:
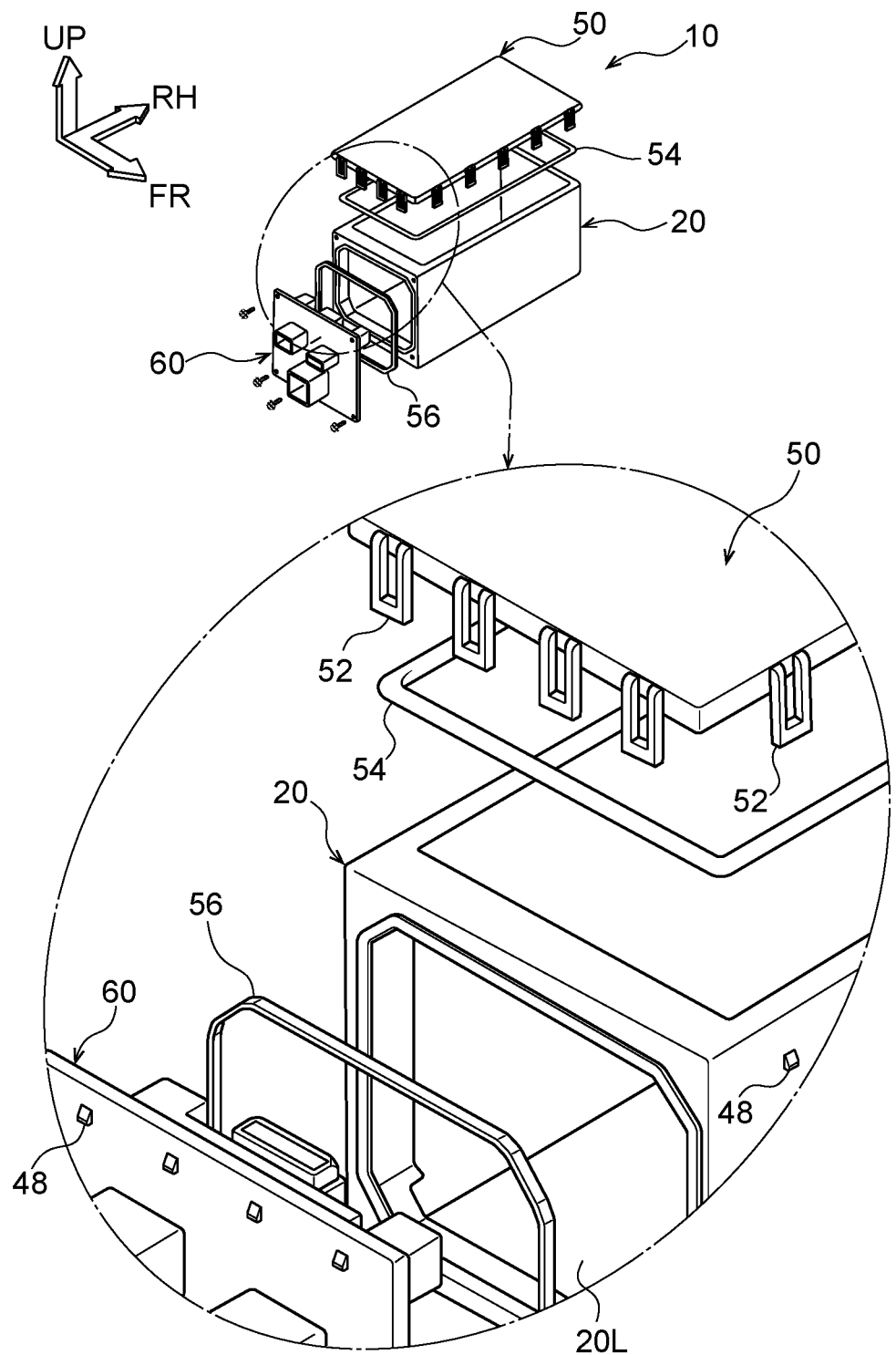
FIG. 3 is an exploded perspective view showing a magnification of engaging portions of a cover member of the battery pack according to the present exemplary embodiment and engaged portions of a connector module.

The cover member 50 is formed in a rectangular flat plate shape with substantially the same size as the floor wall 26 of, for example, a resin material such as polyphenylene sulfide (PPS) or the like. As shown in more detail in FIG. 3, plural engaging portions 52 are equidistantly formed integrally at a periphery edge portion of the cover member 50. The engaging portions 52 depend in substantial "U" shapes. Five of the engaging portions 52 are provided at each longer side portion of the cover member 50 and four of the engaging portions 52 are provided at each shorter side portion.

Plural pawl portions 48 are integrally formed at upper end portions of the respective outer faces of the front wall 22, rear wall 24 and right side wall 28 of the case 20. The pawl portions 48 serve as engaged portions with which the respective engaging portions 52 engage. Five of the pawl portions 48 are equidistantly formed at the upper end portions of the outer faces of each of the front wall 22 and the rear wall 24, and four of the pawl portions 48 are equidistantly formed at the upper end portion of the outer face of the right side wall 28. A plural number of the pawl portions 48 are also integrally formed at an upper end portion of an outer face of the connector module 60. These pawl portions 48 also serve as engaged portions with which the engaging portions 52 engage. That is, four of the pawl portions 48 are equidistantly formed at the upper end portion of the outer face of the connector module 60.

A front and rear pair of pins (not shown in the drawings) protrude toward the connecting member 25 from upper end portions of the inner face of the connector module 60. A front and rear pair of fitting holes (not shown in the drawings) are formed in the connecting member 25. The front and rear pair of pins tightly fit into the front and rear pair of fitting holes. Thus, by the pins being tightly fitted into the fitting holes, the connector module 60 is positioned relative to the left side portion of the case 20 and is attached thereto. As a result, the engaging portions 52 formed at the cover member 50 are engaged with the pawl portions 48 formed at the connector module 60 without mispositioning.

An O-ring 54 that serves as a sealing member is provided between the cover member 50 and the upper end portions of the case 20. The O-ring 54 is formed in a rectangular shape in plan view and is arranged along the upper end portions of the front wall 22, the rear wall 24, the right side wall 28 and the connecting member 25. Similarly, an O-ring 56 that serves as a sealing member is provided between the connector module 60 and left side portions of the case 20. The O-ring 56 is formed in a rectangular shape in side view and is arranged along periphery edge portions of the connector module 60 (left end portions of the floor wall 26, front wall 22 and rear wall 24, and the connecting member 25).

Thus, by the cover member 50 being attached to the case 20 with the O-ring 54 interposed and the connector module 60 being attached to the case 20 with the O-ring 56 interposed, the case 20 fabricated of resin that accommodates the battery stack 12 and so forth is formed as a structure that is hermetically sealed in a waterproof and dustproof state.

As shown in FIG. 1, the battery stack 12 includes a plural number (for example, four) of lithium battery cells (below referred to simply as "the battery cells") 14 and the frame-shaped holder 16 that accommodates the plural battery cells 14. The upper side and both the left and right sides of the holder 16 are open. Each battery cell 14 includes a case 14A that is fabricated of metal (for example, aluminium) and formed in a substantially cuboid shape. The plural battery cells 14 are accommodated side-by-side in the front-and-rear direction in the holder 16, with a thickness direction of the battery cells 14 in the front-and-rear direction. The battery cells 14 are electrically connected in series by the busbar module 18 provided above the battery cells 14. A thermistor and the like are provided at the busbar module 18.

Figure 4:
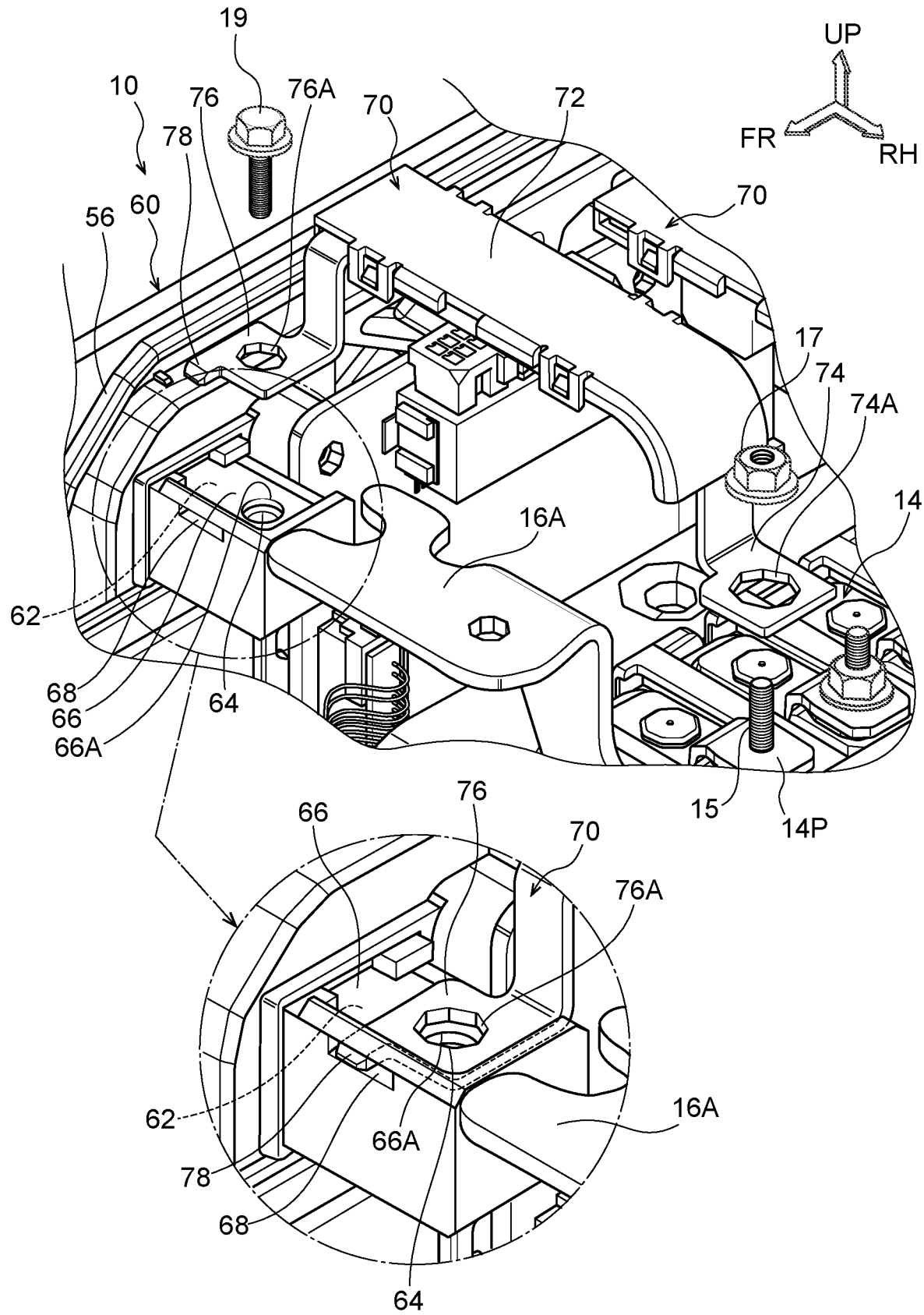
FIG. 4 is an exploded perspective view showing a magnification of a connecting structure of a busbar that electrically connects a battery stack of the battery pack according to the present exemplary embodiment with the connector module.

As shown in FIG. 4, a positive electrode terminal 14P at one side in the front-and-rear direction (for example, the front side) of the battery cells 14 and a negative electrode terminal (not shown in the drawings) at the other side in the front-and-direction (for example, the rear side) of the battery cells 14 are electrically connected by a front and rear pair of busbars 70 to respective electrode terminals 66 provided at the connector module 60.

Each busbar 70 includes a main body portion 72 in a long, narrow, substantially rectangular, flat plate shape, a first connecting portion 74 and a second connecting portion 76. The first connecting portion 74 integrally depends from one length direction end portion (a right end portion) of the main body portion 72 and is formed in a curved shape. The second connecting portion 76 integrally depends from one longer edge portion side of the main body portion 72 at the other length direction end portion (a left end portion) of the main body portion 72.

The first connecting portion 74 of the busbar 70 is formed in a substantial "L" shape as seen in the direction along the shorter edge portions of the busbar 70 (the front-and-rear direction). A penetrating hole 74A with a substantially circular shape (more specifically, a regular octagon shape) is formed in a distal end portion of the first connecting portion 74. An axial direction of the penetrating hole 74A is in the vertical direction.

A weld bolt 15 is provided at the positive electrode terminal 14P of the battery cell 14 at the front side, and a weld bolt (not shown in the drawings) is provided at the negative electrode terminal of the battery cell 14 at the rear side. The weld bolts are inserted into the respective penetrating holes 74A of the first connecting portions 74. A nut 17 is screwed onto the weld bolt 15 from the upper side thereof. In this manner, the respective first connecting portions 74 of the busbars 70 are connected to the positive electrode terminal 14P of the battery cell 14 at the front side and the negative electrode terminal of the battery cell 14 at the rear side.

The second connecting portions 76 of the busbars 70 depend so as to protrude in opposite directions from one another (the front direction and the rear direction). Each second connecting portion 76 is formed in a substantial "L" shape as seen in the direction along the longer side portions of the busbar 70 (the left-and-right direction). A penetrating hole 76A with a substantially circular shape (more specifically, a regular octagon shape) is formed in a distal end portion of the second connecting portion 76. The axial direction of the penetrating hole 76A is in the vertical direction. A pawl portion 78 in a rectangular flat plate shape is formed integrally with the distal end portion of the second connecting portion 76. The pawl portion 78 extends in the protruding direction of the second connecting portion 76.

A front and rear pair of accommodating recess portions 62 with substantially rectangular shapes in plan view are formed in the upper portion of the inner face of the connector module 60. The electrode terminals 66 are provided in the accommodating recess portions 62. Each electrode terminal 66 is fabricated of metal and electrically connected with the corresponding second connecting portion 76. A penetrating hole 66A with a substantially circular shape is formed in the electrode terminal 66. A female thread portion 64 is formed in a floor portion of the accommodating recess portion 62 with an axial direction of the female thread portion 64 in the vertical direction. The penetrating hole 66A is in communication with the female thread portion 64, and a bolt 19 is screwed into the female thread portion 64.

A slit portion 68 is formed in a periphery edge portion at the front-and-rear direction outer side (the side in the protruding direction of the second connecting portion 76) of each accommodating recess portion 62. The pawl portion 78 is inserted into the slit portion 68. When each pawl portion 78 is inserted into the corresponding slit portion 68, the second connecting portion 76 is disposed at a position at which the penetrating hole 76A is in communication with the penetrating hole 66A and the female thread portion 64.

The second connecting portions 76 are provided only at one longer edge portion side of the other length direction end portion (left end portion) of each main body portion 72 and are not well-balanced between left and right. However, because the pawl portions 78 are inserted into the slit portions 68, tilting of the busbars 70 in directions in which the busbars 70 approach one another is prevented. The slit portions 68 into which the pawl portions 78 are inserted are equivalent to a tilting prevention portion.

As shown in FIG. 1, a fitting portion 61 with a rectangular frame shape is formed at a lower portion of the outer face of the connector module 60. The check valve 80 is tightly fitted and engaged with the inner side of the fitting portion 61. The check valve 80 is for exhausting gas such as carbon monoxide (CO) and the like that is discharged from the battery cells 14 due to abnormal heating and fills the interior of the case 20. One end portion of an exhaust pipe 98 is connected to the check valve 80, and the gas is exhausted to the exterior through the exhaust pipe 98. A grommet 99 is provided at the other end portion of the exhaust pipe 98. The grommet 99 prevents entry of foreign bodies from the exterior.

Now, in the battery pack 10 with the structure described above, a heater substrate 100 according to the present exemplary embodiment is described.

Figure 5:
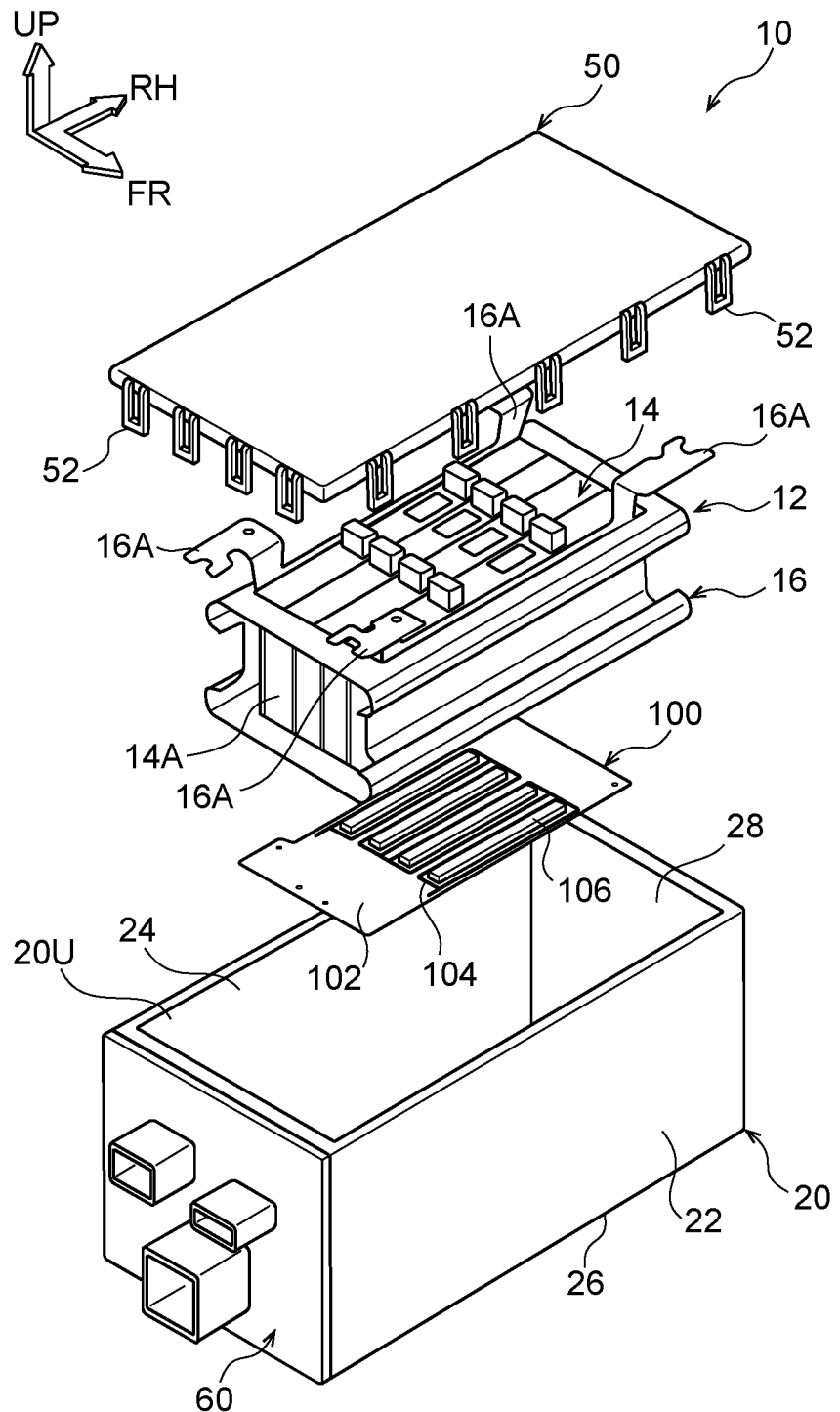
FIG. 5 is an exploded perspective view showing a positional relationship between the battery stack and a heater substrate provided in the case of the battery pack according to the present exemplary embodiment.
Figure 6:
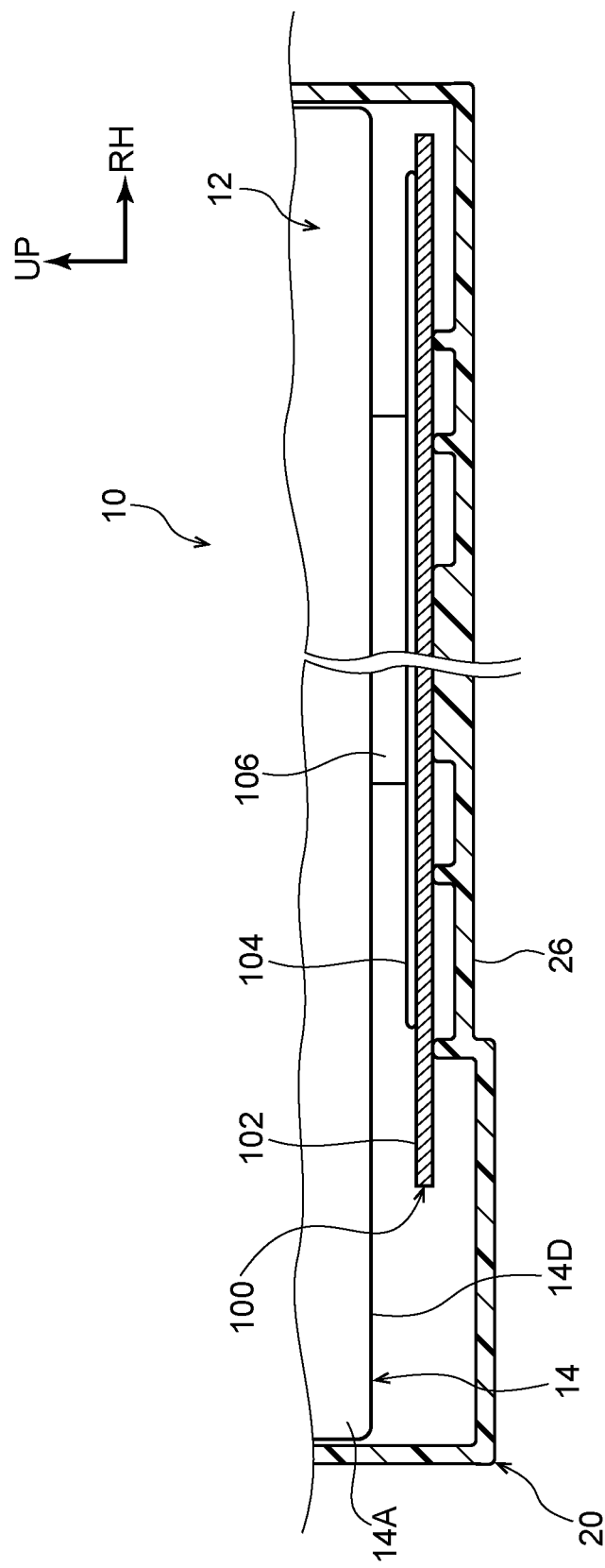
FIG. 6 is a sectional view showing the battery stack and heater substrate provided in the case of the battery pack according to the present exemplary embodiment.

As shown in FIG. 5 and FIG. 6, the heater substrate 100 is disposed inside the case 20 accommodating the battery stack 12, which is to say, along the inner face of the floor wall 26 of the case 20. That is, the heater substrate 100 is disposed between the inner face of the floor wall 26 of the case 20 and a lower face of the battery stack 12 (floor walls 14D that are longer edge portion sides of the cases 14A of the battery cells 14).

Figure 7:
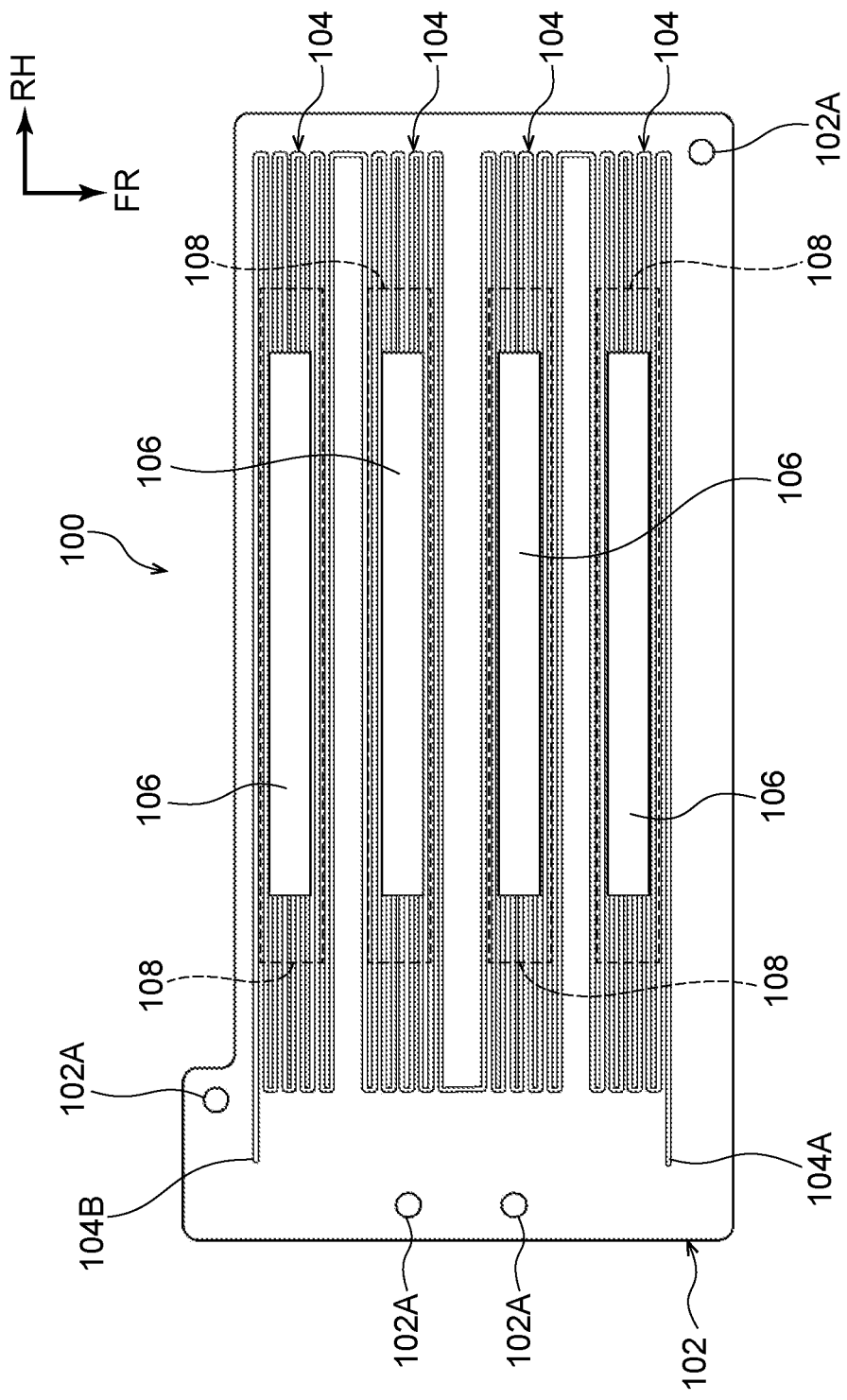
FIG. 7 is a plan view showing the heater substrate provided in the case of the battery pack according to the present exemplary embodiment.

As shown in FIG. 7, the heater substrate 100 includes a substrate main body (below referred to simply as the substrate body) 102, a plural number (for example, four) of copper patterns 104 that serve as metal patterns, and a plural number of heat conduction sheets 106. The heater substrate 100 is formed of epoxy glass in a substantially rectangular flat plate shape that has a relatively small thickness and whose longer direction is in the left-and-right direction. The copper patterns 104 are formed side-by-side in the front-and-rear direction on a top face (one face) of the substrate body 102. The heat conduction sheets 106 are disposed (affixed) on the copper patterns 104.

Penetrating holes 102A for fastening are formed at suitable positions of the substrate body 102. Screws or the like are inserted into the penetrating holes 102A and are screwed into female thread portions (not shown in the drawings) formed in the floor wall 26 of the case 20. Thus, the substrate body 102 is attached to the floor wall 26.

The copper patterns 104 are formed by a single copper wire, which serves as metal wires, extending from one end portion side to the other end portion side of the substrate body 102 in the left-and-right direction, then turning back and being offset in the front-and-rear direction, and extending from the other end portion side to the one end portion side in the left-and-right direction, and this being repeated for a plural number of turns. The copper patterns 104 are separated from one another by increasing a length in the front-and-rear direction of a turnback portion at the one end portion side or the other end portion side. Thus, all of the copper patterns 104 are formed by the single copper wire. Resistance values (heat generation amounts) of the copper patterns 104 are regulated by numbers of turns of the copper wire (the widths of the copper patterns 104, which are specified by numbers of copper wires), lengths of the copper wire (the lengths of the copper patterns 104) and a thickness of the copper wire.

Resist marks 108 are respectively provided in rectangular frame shapes in the regions of the substrate body 102 in which the copper patterns 104 are formed. Each resist mark 108 specifies an area in which the corresponding heat conduction sheet 106 is to be provided, and the heat conduction sheet 106 is affixed inside the resist mark 108. Lengths of the copper patterns 104 in the left-and-right direction are greater than lengths of the resist marks 108 in the left-and-right direction.

Free end portions 104A and 104B of the copper patterns 104 at the two sides of the front-and-rear direction extend to vicinities of a left side end portion of the substrate body 102. The one free end portion 104A is connected to a positive electrode, and the other free end portion 104B is connected to a negative electrode. The copper patterns 104 are electrically connected in series. Thus, the copper patterns 104 are structures that generate heat at the same time (substantially simultaneously) when electrified.

Figure 8:
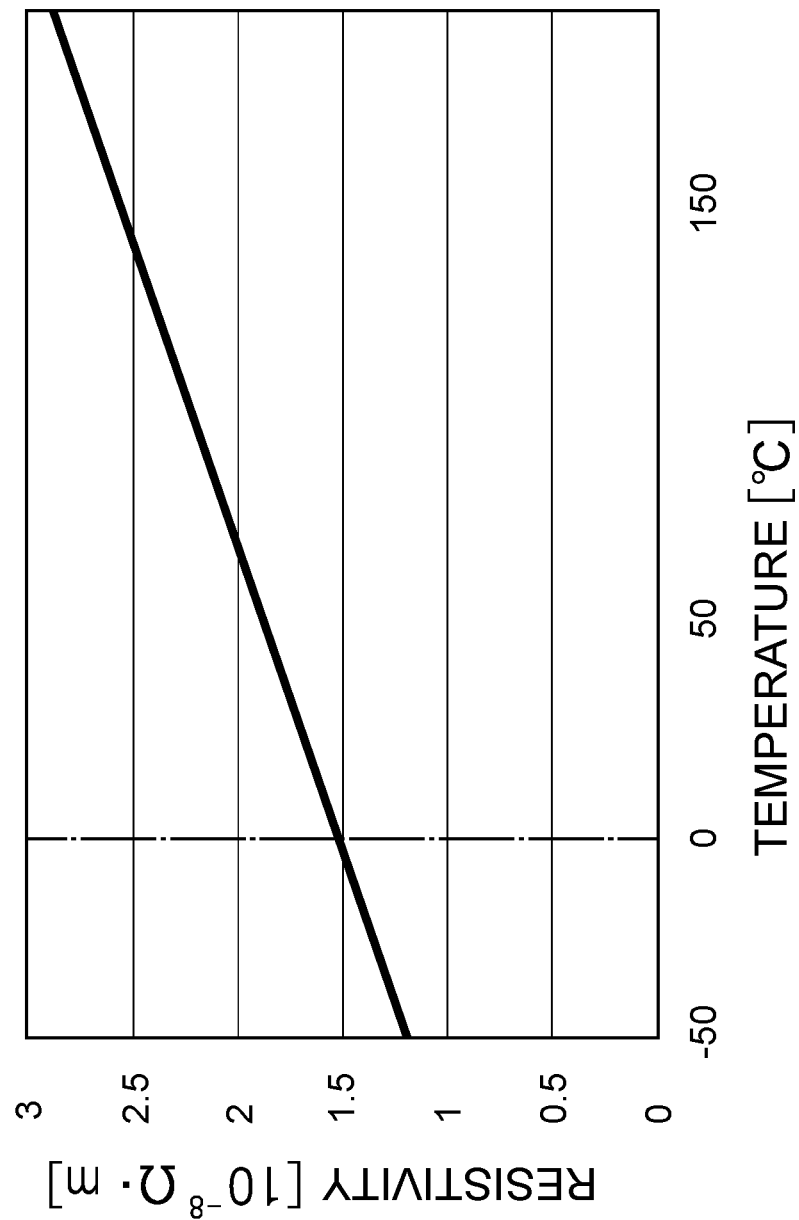
FIG. 8 is a graph showing resistivity with temperature of copper used in the heater substrate provided in the case of the battery pack according to the present exemplary embodiment.

A reason for using the copper patterns 104 as the metal patterns is a resistivity-temperature characteristic of copper, as illustrated in FIG. 8. The resistivity of copper is smaller at times of low temperature and the resistivity is greater at times of high temperature. Therefore, if a fixed voltage is applied to the copper patterns 104, because heat generation amounts are greater at times of low temperature, the warming function is increased, and because heat generation amounts are smaller at times of high temperature, the battery cells 14 may not be caused to reach an ignition temperature.

As shown in FIG. 7, each heat conduction sheet 106 is formed in a rectangular flat plate shape in plan view of which the longer direction is in the left-and-right direction. As shown in FIG. 6, a thickness of the heat conduction sheet 106 is greater than the thickness of the substrate body 102. A lower face (wall face) of the floor wall 14D of the corresponding battery cell 14 is disposed on the heat conduction sheet 106, and the heat conduction sheet 106 is compressed into a flattened shape by the weight of the battery cell 14.

That is, each heat conduction sheet 106 is interposed between the mutually opposing lower face of the floor wall 14D of the battery cell 14 and upper face of the copper pattern 104, the upper face of the heat conduction sheet 106 contacts the lower face of the floor wall 14D of the battery cell 14 with a predetermined pressure, and the lower face of the heat conduction sheet 106 contacts the upper face of the copper pattern 104 with a predetermined pressure.

Thus, the copper patterns 104 do not make direct contact with the battery cells 14 but heat generated from the copper patterns 104 is conducted through the heat conduction sheets 106 to the battery cells 14. That is, the heater substrate 100 according to the present exemplary embodiment may individually heat (regulate the temperature of) each one of the battery cells 14.

Now, operation of the battery pack 10 according to the present exemplary embodiment that is provided with the heater substrate 100 with the structure described above is described.

As described above, the heater substrate 100 is provided at the inner face of the floor wall 26 of the case 20 in which the battery stack 12 is accommodated, and the heater substrate 100 includes the plural copper patterns 104 corresponding with the battery cells 14. That is, the lower faces of the floor walls 14D of the battery cells 14 of the battery stack 12 are in contact with the copper patterns 104 of the heater substrate 100 via the heat conduction sheets 106.

Therefore, when a fixed voltage is applied to the copper patterns 104 of the heater substrate 100, the copper patterns 104 respectively generate heat, and the battery cells 14 may be respectively warmed by the heated copper patterns 104 via the heat conduction sheets 106. Thus, each one of the battery cells 14 may be heated individually. Therefore, a decline in performance of the battery cells 14 at a time of low temperature may be suppressed or prevented.

Furthermore, copper has the resistivity-temperature characteristic in which the resistivity is smaller at times of low temperature and the resistivity is greater at times of high temperature (see FIG. 8). Therefore, because the heat generation amounts are greater at a time of low temperature, the battery cells 14 may be respectively warmed in a short duration, and because the heat generation amounts are smaller at a time of high temperature, a risk of the battery cells 14 being heated more than necessary may be removed and ignition in the battery cells 14 may be prevented.

Because the interior of the case 20 is hermetically sealed, the battery cells 14 accommodated in the hermetically sealed case 20 may be warmed efficiently even though the heater substrate 100 is provided only at the side of the case 20 at which the floor wall 26 is disposed (and the copper patterns 104 only oppose the lower faces of the floor walls 14D of the battery cells 14).

The case 20 that is fabricated of resin may reduce weight of the battery pack 10, reduce thermal conductivity (a thermal resistance value is high), and impede dissipation of heat from the interior to the exterior (the atmosphere). The substrate body 102 fabricated of epoxy glass is excellent in heat resistance and lowers thermal conductivity (a thermal resistance value is high). Therefore, heat generated from the copper patterns 104 is unlikely to be transmitted through the substrate body 102 and the case 20 to other regions (including the atmosphere). With this combination of structures, each of the battery cells 14 may be warmed efficiently.

To present a specific example, warming of around 5° C.-6° C. each 10 minutes may be conducted. Because the substrate body 102 of the heater substrate 100 is formed of epoxy glass, the substrate body 102 may be formed to be relatively thin but resistant to warping deformation. Therefore, even when there is little placement space inside the case 20, the heater substrate 100 may be arranged easily and appropriately.

The resist marks 108 that specify the areas in which the heat conduction sheets 106 are affixed are provided at the substrate body 102 of the heater substrate 100. Therefore, the heat conduction sheets 106 may be affixed easily without being mispositioned, and the heat conduction sheets 106 may efficiently heat the battery cells 14 effectively.

The lengths of the copper patterns 104 are formed to be longer than the lengths of the resist marks 108. The resistance value (and heat generation amount) of each copper pattern 104 is regulated by the length thereof (the lengths of the copper wires), the width thereof (the number of the copper wires), and the thickness of the copper wires. Therefore, for example, when the widths of the copper patterns 104 are constant and heat generation amounts of at least a predetermined value are to be provided, if the lengths of the copper patterns 104 were shorter than the lengths of the resist marks 108, heat generation amounts of at least the predetermined value would not be provided unless the thickness of the copper wire forming the copper patterns 104 was reduced.

However, with the heater substrate 100 according to the present exemplary embodiment, because the lengths of the copper patterns 104 are longer than the lengths of the resist marks 108, even when the widths of the copper patterns 104 (the numbers of copper wires) are constant and heat generation amounts of at least the predetermined value are to be provided, reducing the thickness of the copper wire forming the copper patterns 104 can be avoided. Therefore, even though the placement areas in which the copper patterns 104 are formed are small in the width direction (the front-and-rear direction), the resistance values (and heat generation amounts) may be adjusted without breaks in the copper patterns 104.

As described above, the connecting portion 46 that connects the left-and-right direction central portions of the front arm 42 and rear arm 44 of the flue plate 40 is disposed between the left-and-right direction central portion of the upper end portion of the front wall 32 and the left-and-right direction central portion of the upper end portion of the rear wall 34. Thus, the connecting portion 46 functions as a bracing rod between the upper end portion of the front wall 32 and the upper end portion of the rear wall 34.

Therefore, even though the case 20 is fabricated of resin rather than metal, strength with respect to an external force (a load) applied in the front-and-rear direction (the thickness direction of the battery cells 14) may be improved. Thus, when a collision load in the front-and-rear direction is applied to the battery pack 10 equipped with the case 20 fabricated of resin, collision resistance (load withstand performance) may be assured.

As described above, the engaging portions 52 of the cover member 50 are engaged with the pawl portions 48 of the connector module 60 that is positioned relative to the case 20. Therefore, compared to a structure in which, for example, the connecting member 25 is disposed at the upper side relative to the connector module 60 and engaging portions are engaged with pawl portions formed at the connecting member 25 (the case 20), the height of the case 20 may be reduced by an amount corresponding to the height of the connecting member 25. In other words, an increase in height of the battery pack 10 may be suppressed by the pawl portions 48 being formed at the upper end portion of the outer face of the connector module 60, and the battery pack 10 may be reduced in size.

As described above, when the penetrating hole 76A of each second connecting portion 76 is put into communication with the penetrating hole 66A and the female thread portion 64 (when the busbar 70 is being attached to the connector module 60), the pawl portion 78 is inserted into the slit portion 68. Therefore, tilting of the busbar 70 in a direction in which the busbars 70 approach one another may be prevented even when fingers are removed from the busbar 70. Hence, the second connecting portion 76 is connected with the electrode terminal 66 by the bolt 19 being inserted into the penetrating hole 76A and the penetrating hole 66A and screwed into the female thread portion 64. Thus, the operation of screwing in the bolt 19 is easy (ease of operation of the attachment may be improved).

Because the busbars 70 do not tilt in the directions approaching one another, occurrences of short circuits and the like may be prevented and safety may be further assured. Because the tilting prevention portions are constituted by the slit portions 68 into which the pawl portions 78 are inserted, the structure may be made simpler than a structure in which tilting prevention portions are separately provided.

Because the battery stack 12 of the battery pack 10 is an auxiliary power source, if a main power source ceases to function due to a malfunction or the like, the vehicle may be run some distance by the battery pack 10 (the battery stack 12). Therefore, for example, a self-driving vehicle may be moved to a safe location or a location where repair is possible.

Above, the battery pack 10 according to the present exemplary embodiment has been described on the basis of the attached drawings. However, the battery pack 10 according to the present exemplary embodiment is not limited to the illustrated structures; suitable design modifications may be applied within a scope not departing from the gist of the present invention. For example, the battery pack 10 according to the present exemplary embodiment may be mounted not only at self-driving vehicles but also at battery electric vehicles and the like that can be manually driven.

The heater substrate 100 is not limited to being a structure disposed at the floor wall 26 of the case 20. For example, the heater substrate 100 may be disposed at the battery stack 12 at a left side portion and right side portion of the holder 16, at which left and right side walls (side faces) that are shorter edge portion sides of the cases 14A of the battery cells 14 are exposed. Further, the metal patterns are not limited to being copper patterns; it is sufficient that the metal patterns provide greater heat generation amounts at times of low temperature and smaller heat generation amounts at times of high temperature.

What is claimed is:
1. A battery pack comprising:
   a battery stack including a plurality of battery cells arrayed in a thickness direction;
   a housing accommodating the battery stack;
   a heater substrate including metal patterns that are electrified to generate heat, the heater substrate being disposed inside the housing such that the metal patterns respectively oppose the plurality of battery cells; and
   a plurality of heat conduction sheets respectively interposed between the plurality of battery cells and the metal patterns, wherein
   the metal patterns are formed by a single wire extending from a first end of the heater substrate to a second end of the heater substrate, extending in an offset direction, and returning to the first end,
   the metal patterns are connected electrically in series, and
   a first free end of the metal patterns is connected to a positive electrode and a second free end of the metal patterns is connected to a negative electrode.
2. The battery pack according to claim 1, wherein resist marks are provided at the heater substrate, the resist marks specifying areas in which the heat conduction sheets are provided.

3. The battery pack according to claim 2, wherein a length of the metal patterns is greater than a length of the resist marks.

4. The battery pack according to claim 1, wherein the metal patterns are copper patterns.

5. The battery pack according to claim 1, wherein the housing is fabricated of resin and accommodates the battery stack in a hermetically sealed state.

6. The battery pack according to claim 1, wherein the battery stack is an auxiliary power source.

7. The battery pack according to claim 1, further comprising a reinforcing member disposed inside the housing, the reinforcing member being formed in a frame shape capable of accommodating the battery stack at an inner side thereof,
wherein a connecting portion extending in the thickness direction is disposed at an upper end portion of the reinforcing member.

8. The battery pack according to claim 1, further comprising:
a side lid portion that closes off an opening portion formed in one side portion of the housing; and
an upper lid portion that closes off an opening portion formed in an upper portion of the housing,
wherein the side lid portion includes an engaged portion with which an engaging portion formed at the upper lid portion engages.

9. The battery pack according to claim 1, further comprising:
a side lid portion that closes off an opening portion formed in one side portion of the housing; and
a busbar that electrically connects an electrode terminal provided at the battery stack with an electrode terminal provided at the side lid portion,
wherein the side lid portion includes a tilting prevention portion that prevents tilting of the busbar at a time of attachment of the busbar.

10. The battery pack according to claim 9, wherein the tilting prevention portion includes a slit portion into which a pawl portion formed at the busbar is inserted.

11. The battery pack according to claim 1, wherein
the metal patterns include a number of turns in the offset direction, and
the metal patterns are separated from each other by increasing a length in the offset direction relative to a length of the turns.

12. The battery pack according to claim 1, wherein the metal patterns generate the heat via resistance of the single wire when electrified.

13. A battery pack comprising:
a battery stack including a plurality of battery cells arrayed in a thickness direction;
a housing accommodating the battery stack;
a heater substrate including metal patterns that are electrified to generate heat, the heater substrate being disposed inside the housing such that the metal patterns respectively oppose the plurality of battery cells; and
a plurality of heat conduction sheets respectively interposed between the plurality of battery cells and the metal patterns, wherein
the metal patterns are formed by a single wire extending from a first end of the heater substrate to a second end of the heater substrate, extending in an offset direction, and returning to the first end,
the metal patterns are connected electrically in series,
a first free end of the metal patterns is connected to a positive electrode and a second free end of the metal patterns is connected to a negative electrode, and
a first interval in the offset direction between turns of one of the metal patterns is less than a second interval in the offset direction between two consecutive metal patterns of the metal patterns.

14. A battery pack comprising:
a battery stack including a plurality of battery cells arrayed in a thickness direction;
a housing accommodating the battery stack;
a heater substrate including metal patterns that are electrified to generate heat, the heater substrate being disposed inside the housing such that the metal patterns respectively oppose the plurality of battery cells; and
a plurality of heat conduction sheets respectively interposed between a lower face of a floor wall of the plurality of battery cells and an upper face the metal patterns that faces the lower face, wherein
the metal patterns are formed by a single wire extending from a first end of the heater substrate to a second end of the heater substrate, extending in an offset direction, and returning to the first end,
the metal patterns are connected electrically in series,
a first free end of the metal patterns is connected to a positive electrode and a second free end of the metal patterns is connected to a negative electrode,
an upper face of the heat conduction sheets contact the lower face of the floor wall of the battery cells with a first predetermined pressure, and
a lower face of the heat conduction sheets contact the upper face of the metal patterns with a second predetermined pressure.

* * * * *